United States Patent Office 3,271,404
Patented Sept. 6, 1966

3,271,404
ANTI-CONVULSANT COMPOUNDS
Rudolf G. Griot, Florham Park, N.J., assignor to Sandoz, Inc., Hanover, N.J., a corporation of New York
No Drawing. Filed July 25, 1963, Ser. No. 297,708
7 Claims. (Cl. 260—294.7)

This invention relates to novel chemical compounds which possess excellent anti-convulsant activity.

In copending application Serial No. 296,908, filed July 23, 1963, compounds having a high degree of anti-convulsant properties in laboratory animals have been described and claimed. It has now been found that when the oxa members of those compounds have their OH group replaced by H a new series of compounds results possessing even better anti-convulsant activity for the treatment of the seizures of epilepsy. These new compounds have the formula:

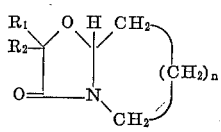

in which $R_1$ is hydrogen, lower alkyl such as methyl, aralkyl such as benzyl, mononuclear carboxylic such as phenyl or cycloalkyl such as cyclohexyl, $R_2$ is lower alkyl such as methyl, aralkyl such as benzyl, mononuclear carboxylic such as phenyl or cycloalkyl such as cyclohexyl, and $n$ is an integer of from 2 to 5.

The compounds of the present invention can be produced either from the intermediates or the final products of said copending application in accordance with the following reaction scheme:

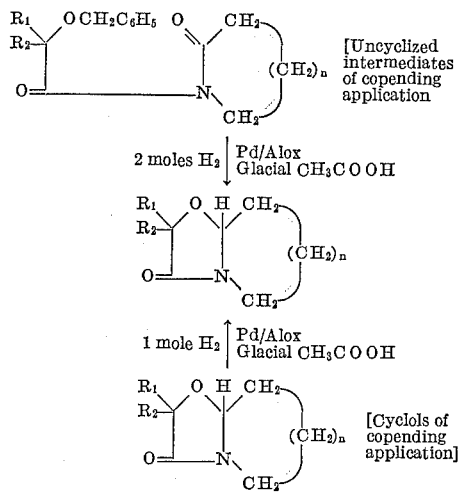

$R_1$, $R_2$ and $n$ have the meanings set forth above. The uncyclized intermediates and the cyclols used to produce the compounds of the present invention are prepared as described in the said copending application.

The compounds of this invention are produced by the reductive cleavage of the benzyl group of the above uncyclized intermediates in the presence of concentrated or glacial acetic acid while adding two moles of hydrogen and employing palladium on alumina as catalyst or by hydrogenating the above cyclols while adding one mole of hydrogen in the presence of concentrated or glacial acetic acid and employing palladium on alumina as catalyst.

The invention is illustrated by the following non-limitative examples.

EXAMPLE 1

8-methyl-7-oxa-1-azabicyclo-[4.3.0]-nonanone-(9)

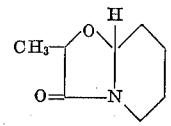

The above compound was obtained in 70% yield from 6-hydroxy - 8 - methyl - 7 - oxa - 1 - azabicyclo-[4.3.0.]-nonanone-(9) by hydrogenation with one mole of hydrogen in glacial acetic acid on palladium/alumina as catalyst or from N-(2-benzyloxypropionyl)-piperidone by hydrogenation under the same conditions with two moles of hydrogen. [B. Pt. 79° C./0.08 mm.;

$$n_D^{20} = 1.4838$$

infrared: 1700 cm.$^{-1}$ (lactam C=O)].
$C_8H_{13}NO_3$: C, 61.9%; H, 8.4%; N, 9.2%; O, 20.9% (calculated). C, 61.4%; H, 8.4%; N, 9.0%; O, 20.6% (found).

EXAMPLE 2

8,8-dimethyl-7-oxa-1-azabicyclo-[4.3.0.]-nonanone-(9)

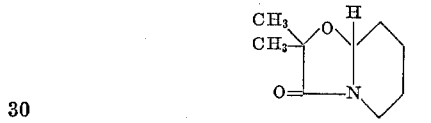

This compound was obtained by the hydrogenation of N-(α-benzyloxy-butyryl)-piperidone in glacial acetic acid with two moles of hydrogen and a palladium catalyst. [B. Pt. 105–110° C./12 mm.; $n_D^{20} = 1.4762$; infrared: 1705 cm.$^{-1}$ (lactam —CO); NMR: multiplet at 289 c.p.s. (H in position 7), two singlets at 278 c.p.s. and 274 c.p.s. respectively, due to the two $CH_3$— groups].
$C_9H_{15}NO_2$: Calculated—C, 63.9%; H, 8.9%; N, 8.3%. Found: C, 63.4%; H, 9.4%; N, 8.4%.

EXAMPLE 3

9-methyl-8-oxa-1-azabicyclo-[5.3.0.]-decanone-(10)

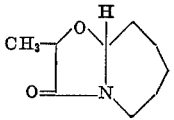

The above compound was obtained either by the hydrogenation of racemic 7-hydroxy-9-methyl-8-oxa-1-azabicyclo-[5.3.0.]-decanone-(10) with one mole of hydrogen in glacial acetic acid or by the reduction of racemic N-(α-benzyloxy-propionyl)-caprolactam with two moles of hydrogen in glacial acetic acid and in the presence of palladium/alumina as catalyst. Yield: approximately 80%. [B. Pt. 75–80° C./0.08 mm.; $n_D^{20} = 1.4844$; ultraviolet: λ max. 197 mμ (ε=7600)].

EXAMPLE 4

9,9-dimethyl-8-oxa-1-azabicyclo-[5.3.0.]-decanone-(10)

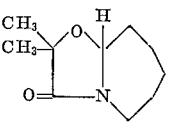

This compound was obtained by the hydrogenation of N-(α-benzyloxyisobutyryl)-caprolactam in glacial acetic acid with two moles of hydrogen and a palladium catalyst. [B. Pt. 100–105° C./13 mm., $n_D^{20} = 1.4793$; infrared: 1700 cm.$^{-1}$ (lactam —CO); NMR: triplet of the H in position 7 at 310 c.p.s. ($J=3$ c.p.s.); two singlets of the two CH$_3$— groups at 74 c.p.s. and 78 c.p.s. respectively].

C$_{10}$H$_{17}$NO$_2$: Calculated—H, 9.4%; N, 7.6%. Found: H, 9.4%; N, 7.5%.

N-(α-benzyloxyisobutyryl)-caprolactam

The above N-(α-benzyloxyisobutyryl)-caprolactam of the formula:

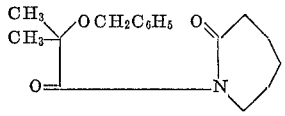

was prepared in 47% yield from caprolactam and α-benzyloxyisobutyryl chloride of boiling point 80° C./0.01 mm.

The N-(α-benzyloxyisobutyryl)-caprolactam has the following properties: B. Pt. 115° C./0.007 mm.; $n_D^{20}=1.5234$; infrared: 1715 cm.$^{-1}$ (lactam —CO, 1670 cm.$^{-1}$ amide —CO).

EXAMPLE 5

*9-phenyl-8-oxa-1-azabicyclo-[5.3.0.]-decanone-(10)*

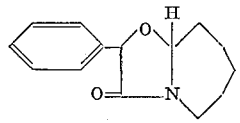

This substance was obtained by the hydrogenation of N-(α-benzyloxy-phenylacetyl)-caprolactam prepared as set forth in the aforesaid copending application with 2 moles of hydrogen in acetic acid solution and a palladium/alumina catalyst.

Yield: 59%. [B.p. 140° C./0.01 mm.; $n_D^{20}=1.5458$].

C$_{14}$H$_{17}$NO$_2$: Calculated—C, 72.7%; H, 7.4%; N, 6.1%. Found: C, 72.7%; H, 7.6% N, 6.3%.

In similar manner, 9 - benzyl - 8 - oxa-1-azabicyclo-[5.3.0.]-decanone-(10) was prepared by hydrogenation of the corresponding N-(α-benzyloxy-benzylacetyl)-caprolactam.

What is claimed is:

1. A compound of the formula:

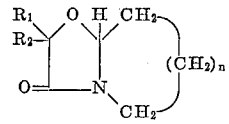

in which R$_1$ is selected from the group consisting of hydrogen, lower alkyl, benzyl, phenyl and cyclohexyl, R$_2$ is selected from the group consisting of lower alkyl, benzyl, phenyl and cyclo hexyl and *n* is an integer in the range of 2 to 3.

2. 8-methyl-7-oxa-1-azabicyclo[4.3.0.]-nonanone-(9).
3. 8,8 - dimethyl-7-oxa-1-azabicyclo[4.3.0.]-nonanone-(9).
4. 9-methyl-8-oxa-1-azabicyclo[5.3.0.]-decanone-(10).
5. 9,9 - dimethyl-8-oxa-1-azabicyclo[5.3.0.]-decanone-(10).
6. 9-phenyl-8-oxa-1-azabicyclo[5.3.0.]-decanone-(10).
7. 9-benzyl-8-oxa-1-azabicyclo[5.3.0.]-decanone-(10).

References Cited by the Examiner

Stich et al.: Helv. Chim. Acta, vol. 46, pp. 1151–1157 (1963), (published June 17, 1963).

ALEX MAZEL, *Primary Examiner.*

NICHOLAS S. RIZZO, *Examiner.*

ALTON D. ROLLINS, RICHARD J. GALLAGHER, *Assistant Examiners.*